Patented Jan. 8, 1946

2,392,794

UNITED STATES PATENT OFFICE 2,392,794

VAT DYESTUFFS OF THE ANTHRAQUINONE SERIES

Werner Zerweck and Ernst Honold, Frankfort-on-the-Main-Fechenheim, Germany, assignors to General Aniline & Film Corporation, New York, N. Y., a corporation of Delaware No Drawing. Application May 17, 1940, Serial No. 335,760. In Germany June 6, 1939

4 Claims. (Cl. 260—274)

Our present invention relates to vat dyestuffs of the anthraquinone series more particularly to those of the general formula:

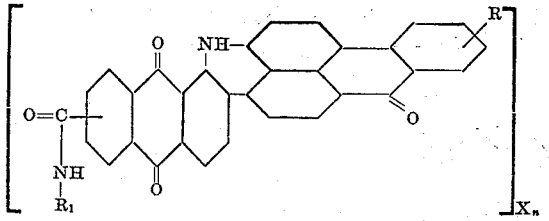

wherein R stands for a member of the group consisting of hydrogen and the radicle of an amine of a vattable ring system, containing at least one anthracene nucleus, $R_1$ means a radicle of the anthraquinone series, X halogen and $n$ stands for a number from 0 to 4.

The new condensation products are obtained by acting on compounds of the general formula:

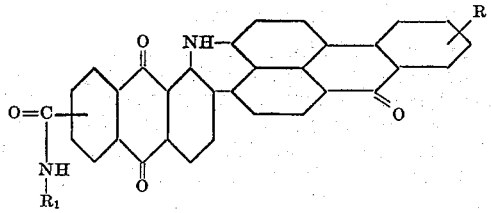

wherein R and $R_1$ have the aforesaid significance with alkaline condensation agents under such reaction conditions that no saponification of the carbon amide group occurs. This may be accomplished for instance by heating the initial material together with caustic alkali in indifferent solvents such as for example pyridine or aminoethanol. Thereby ring closure is effected.

The new dyestuffs thus obtained dye cotton from the vat valuable olive to brown shades of good fastness properties. When aftertreated with halogenating agents, the dyestuffs yield in many cases dyeings which are distinguished by clearer shades and a better fastness to chlorine.

In order to further illustrate our invention the following examples are given, the parts being by weight and all temperatures in degrees centigrade.

Example 1

47 parts of 1-aminoanthraquinone-6- or 7-carboyl-1'-aminoanthraquinone (which may be prepared for instance by reducing the corresponding nitro compound) are mixed with 31 parts of bz₁-bromo-benzanthrone, 25 parts of sodium acetate and 2 parts of cuprous chloride, and the mixture is boiled for about 12 hours in nitrobenzene. The condensation product formed is separated in the usual manner and dried. It is soluble in concentrated sulfuric acid with a yellowish-brown color and dyes cotton from a brownish-violet vat brown shades which do not possess particular fastness properties.

50 parts of this condensation product are finely divided in a solution of 50 parts of caustic potash in about 250 parts of aminoethanol and the mixture is heated to 100–110° for about 2 hours. Then the dyestuff formed is precipitated by diluting the mixture with water and blowing through a stream of air, or also by the addition of an acid. The new dyestuff of the formula:

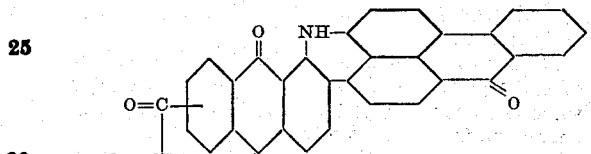

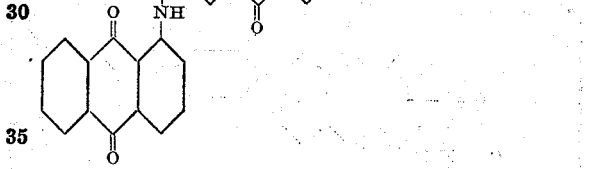

is soluble in concentrated sulfuric acid with a green color and dyes cotton from a bluish-black vat very fast yellowish olive-green shades.

The same dyestuff is also obtained by employing as condensation agent caustic potash with the addition of pyridine or also sodium aniline.

By stirring 10 parts of the above dyestuff in about 100 parts of o-dichlorobenzene together with 6 parts of sulfuryl chloride at room temperature for about 2–3 hours, subsequently at about 100° for two hours and finally while boiling under a reflux condenser for about 4 to 5 hours, a halogenated dyestuff is obtained which is separated when cool and substantially corresponds to the formula:

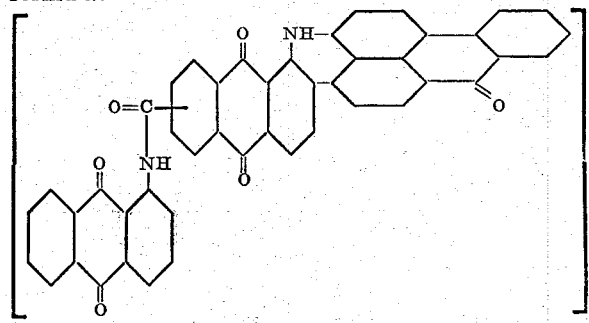

It is soluble in concentrated sulfuric acid with a green colour and dyes cotton from a bluish-black vat more bluish olive-green shades. The fastness properties of the dyeings thus obtained, particularly the fastness to chlorine, are better than those of the dyestuff which has not been subjected to such aftertreatment.

A similar dyestuff is obtained when introducing about 2 atoms bromine into the aforesaid condensation product. The introduction may be effected in the usual manner, for instance by treatment with bromine in the presence of an organic solvent.

*Example 2*

A mixture of 59 parts of 1-aminoanthraquinone-6-(-7-) carboyl-1'-amino-5'-benzolylamino-anthraquinone, obtainable by reducing the corresponding nitrocompound by means of sodium-sulfide, and of 31 parts of bz₁-brombenzanthrone is heated with the addition of an acid binding agent and of a copper salt as catalyst for some hours in the presence of boiling nitrobenzene. The condensation product is soluble in concentrated sulfuric acid with a brown color and dyes cotton brown shades from a violetish black vat.

50 parts thereof are mixed with a solution of 60 parts of caustic potash in about 300 parts of aminoethanol and the mixture is heated while stirring for about 3 hours at about 110°. The formed dyestuff is isolated after having diluted the reaction mass with water. It dissolves in concentrated sulfuric acid with a green color and dyes cotton from a bluish black vat very strong yellowish olive-green shades.

By treatment with 2 to 3 molecular proportions of sulfuryl chloride in the presence of an organic solvent a halogenated dyestuff is formed which corresponds substantially to the formula:

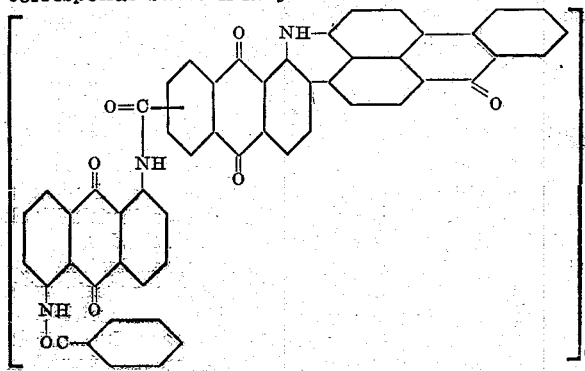

It dyes cotton from a blackish vat valuable olive-green shades. By treatment with 4 to 6 molecular proportions of bromine the analogous brominated dyestuff is obtained of similar properties.

*Example 3*

In an analogous manner as described in Example 2 59 parts of 1-amino-anthraquinone-6-

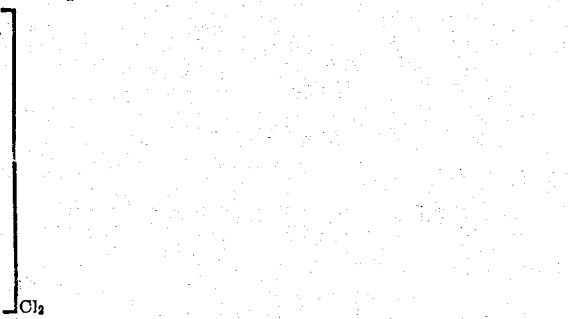

(-7-)-carboyl-1'-amino-4'-benzoylaminoanthraquinone, obtainable by reducing the corresponding nitrocompound by dissolving it in the vat, are condensed with 31 parts of bz₁-bromo-benzanthrone. The condensation product dissolves in concentrated sulfuric acid with a reddish brown color and dyes cotton from a violetish black vat brownish red shades. It is treated with a caustic potash solution in aminoethanol as described in the foregoing examples. The formed dyestuff of the formula:

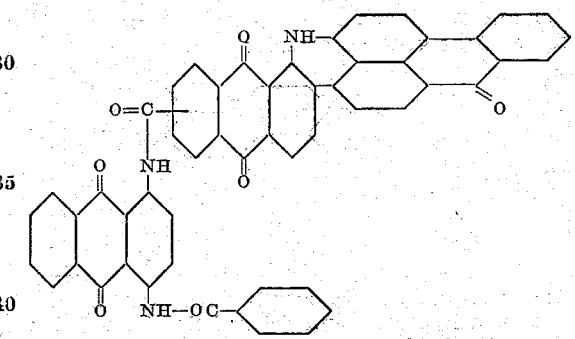

dissolves in concentrated sulfuric acid with a green color and dyes cotton from a bluish vat brownish olive shades. When halogenated, for instance by means of sulfurylchloride, it dyes somewhat more greenish shades of increased fastness.

*Example 4*

A mixture of 20 parts of 6-bz₁-dibromobenzanthrone and 48 parts of 1-aminoanthraquinone-6-(-7-) carboyl-1'-aminoanthraquinone is heated for about 16 hours in the presence of boiling nitrobenzene with the addition of sodium carbonate and cuprous chloride as catalyst. The condensa-

tion product dissolves in concentrated sulfuric acid with a brownish color and dyes cotton brownish shades from a violetish brown vat.

A mixture of 20 parts of the finely divided condensation product and of a solution of 20 parts of caustic potash in about 150 parts of aminoethanol is heated for about 2–3 hours at about 110°. The formed dyestuff is isolated by adding water and blowing in air. It corresponds with the formula:

dissolves in concentrated sulfuric acid with a green color and dyes cotton from a blackish vat valuable khaki shades.

The chlorinated dyestuff obtained by treat-

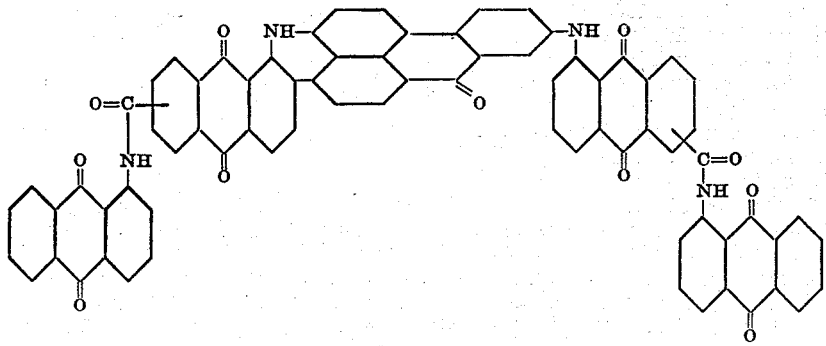

It dissolves in concentrated sulfuric acid with a green color and dyes cotton fast olive shades from a brownish black vat.

Example 5

60 parts of 1-aminoanthraquinone-6-(-7-)-carboyl-1'-amino-5'-benzoylaminoanthraquinone are condensed as described above with 20 parts of 6-bz$_1$-dibromo-benzanthrone. The condensation product dissolves in concentrated sulfuric acid with a brown color and dyes cotton brownish shades from a dark brown vat. When treated with a mixture of caustic potash and aminoment with 2 to 3 molecular proportions, of sulfurylchloride in the presence of an organic solvent dyes somewhat more greenish shades of an increased fastness.

When subjecting to the action of a mixture of caustic potash and aminoethanol the condensation product of one molecular proportion of 6-bz$_1$-dibromobenzanthrone and 2 molecular proportions of 1-aminoanthraquinone-6-(-7-)carboyl-1' - amino - 4' - benzoylaminoanthraquinone ,the formed dyestuff dyes cotton reddish brown shades from a brownish black vat. It corresponds to the formula:

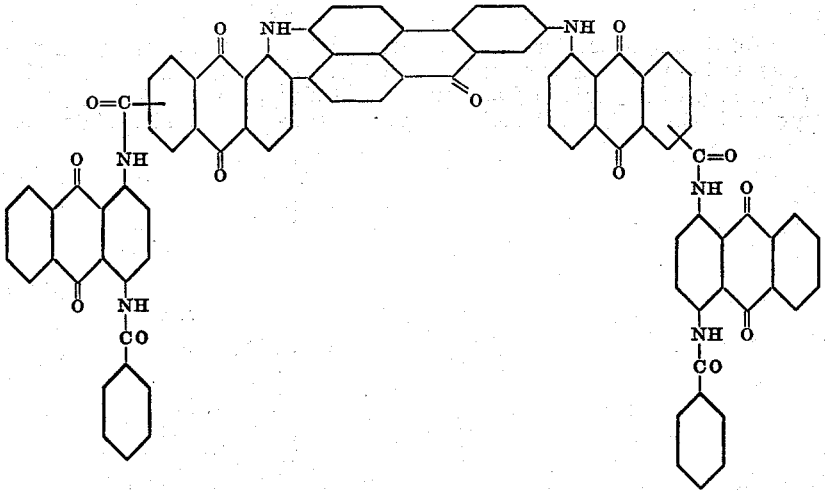

ethanol in the manner as described in Example 4, the formed dyestuff of the formula:

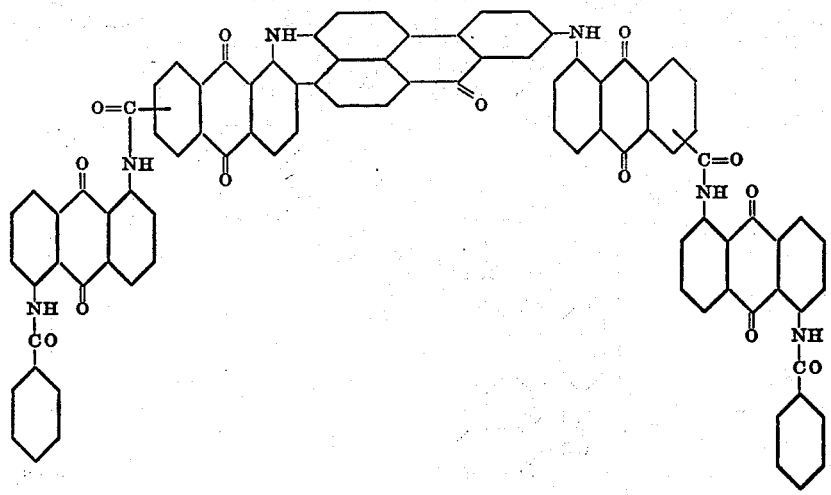

Example 6

A mixture of 47 parts of 1-aminoanthraquinone-6-(-7-)carboyl-1'-aminoanthraquinone, 40 parts of 6-bz₁-dibromobenzanthrone, 24 parts of sodium acetate, 2 parts of cuprous acetate and about 1000 parts of nitrobenzene is heated at about 200° for about 4 hours. Then at about 120° a mixture of 24 parts of 1-amino-anthraquinone, 15 parts of anhydrous sodium carbonate and 2 parts of cuprous chloride is added. Then the mixture is heated for about 12 hours at about 220°. The formed anthrimide-like condensation product is then subjected to the action of a mixture of caustic potash and aminoethanol as described in the foregoing examples. The dyestuff thus obtained dissolves in concentrated sulfuric acid with a green color and dyes the vegetable fibers from a brownish black vat very fast olive shades. It corresponds to the formula:

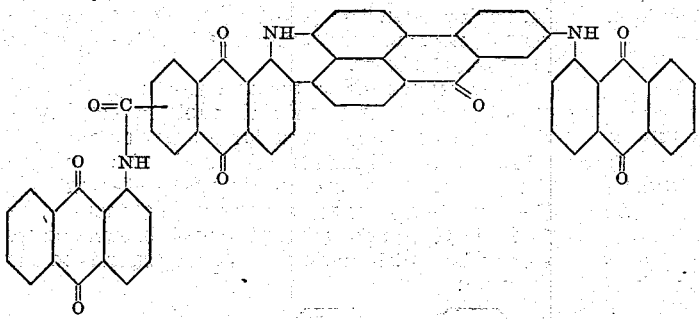

As third component for the aforesaid series of condensation reactions there may be used instead of 1-aminoanthraquinone other amines of vattable ring systems, such as 1-amino-4-methoxy-anthraquinone, amino compounds of the anthrapyrimidine, dibenzanthrone and anthranthrone series. When using a diamino compound, such as 1.5-diamino-anthraquinone, of course a dyestuff is obtained containing twice the condensed radicle as represented by the above formula.

We claim:

1. Vat dyestuffs of the anthraquinone series of the general formula:

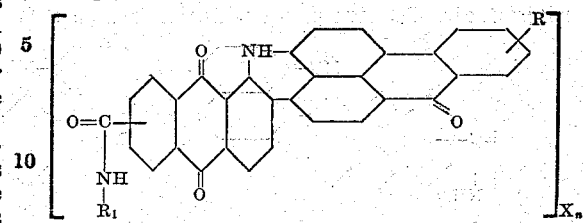

wherein R stands for a member of the group consisting of hydrogen and the radicle of an amine of a vattable ring system, containing at least one anthracene nucleus, $R_1$ means a radicle of the anthraquinone series, the carbonyl amide radical is attached to one of the positions 6 and 7, X halogen and $n$ stands for a number from 0 to 4, which dyestuffs dye the vegetable fibers from the vat valuable olive to brown shades of good fastness properties.

2. The vat dyestuff of the formula:

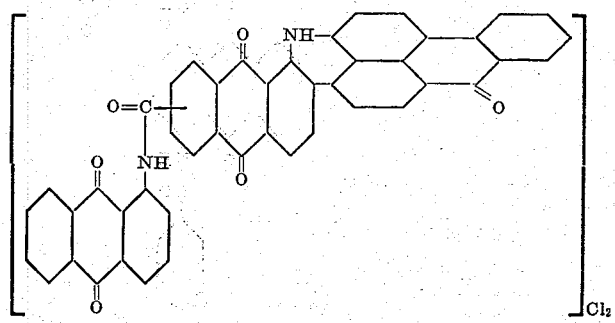

wherein the carbonyl amide radical is attached to one of the positions 6 and 7 which dyestuff is soluble in concentrated sulfuric acid with a green color and dyes cotton from a bluish black vat bluish olive-green shades of good fastness particularly to chlorine.

3. The vat dyestuff of the formula:

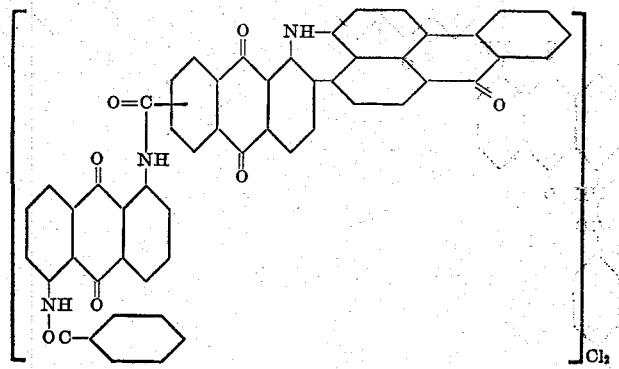

wherein the carbonyl amide radical is attached to one of the positions 6 and 7 which dyestuff is soluble in concentrated sulfuric acid with a green color and dyes cotton from a blackish vat olive green shades of a good fastness.

4. The vat dyestuff of the formula:

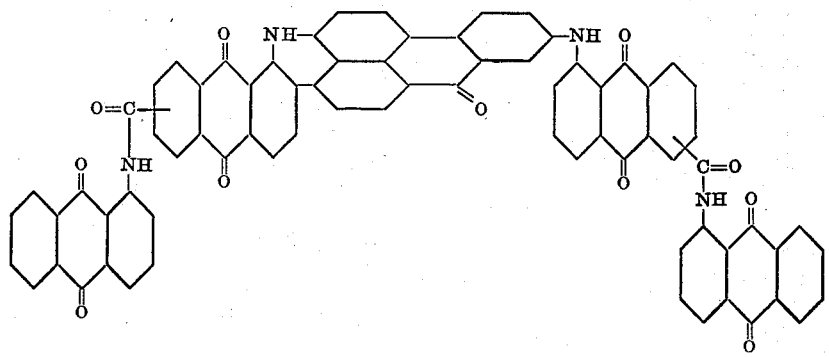

wherein the carbonyl amide radical is attached to one of the positions 6 and 7 which dyestuff dissolves in concentrated sulfuric acid with a green color and dyes cotton from a brownish black vat fast olive shades.

WERNER ZERWECK.
ERNST HONOLD.